C. OHAVEN.
FASTENING.
APPLICATION FILED APR. 23, 1915.

1,207,613.

Patented Dec. 5, 1916.
3 SHEETS—SHEET 1.

Inventor
C. Ohaven.

By
Attorneys

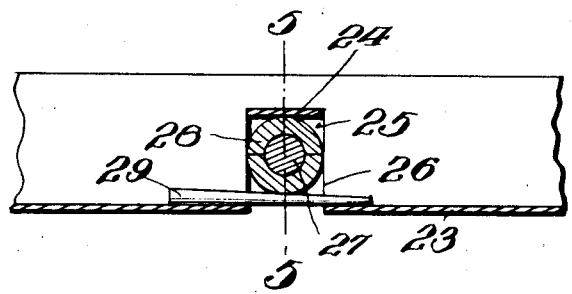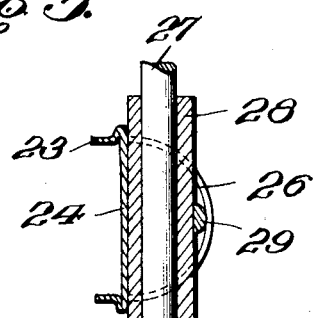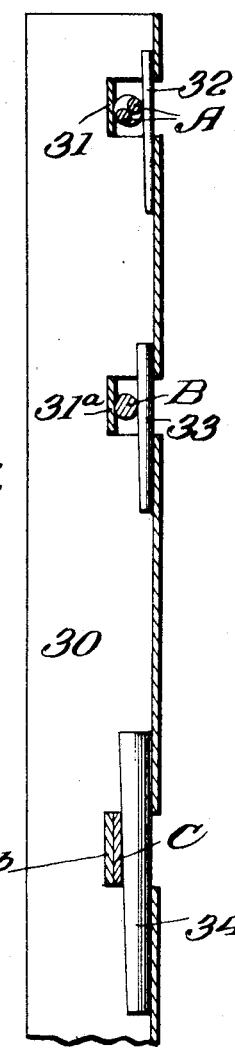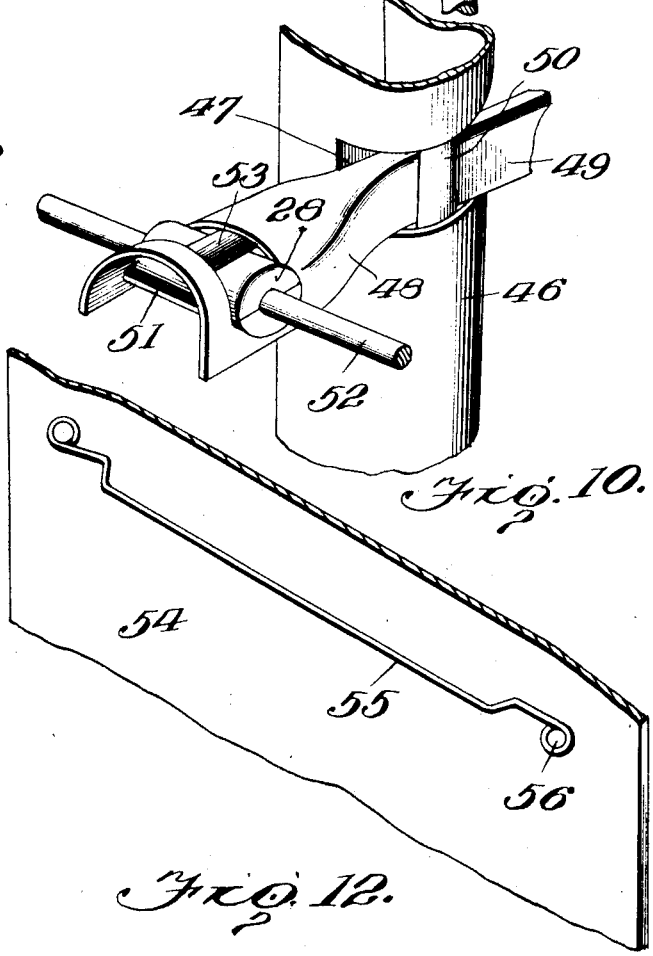

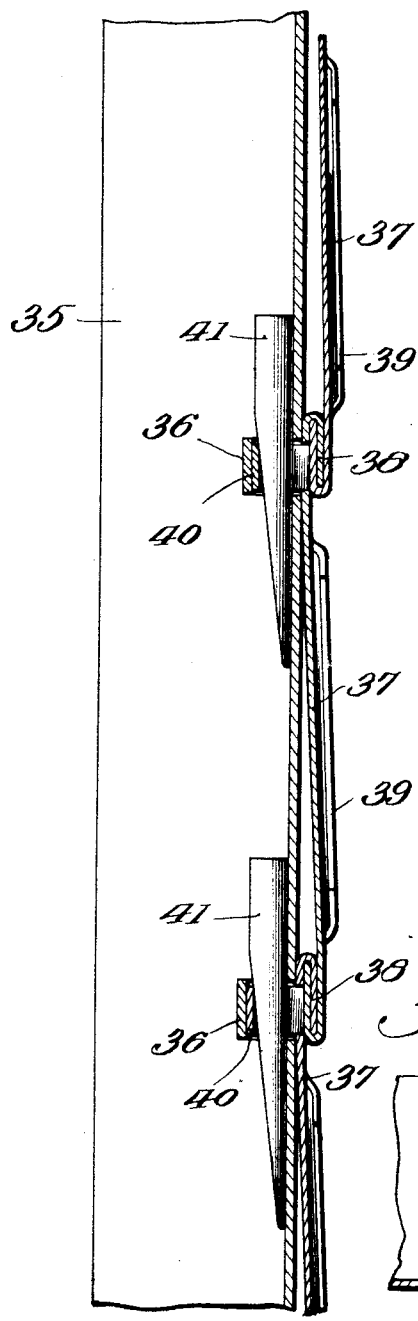
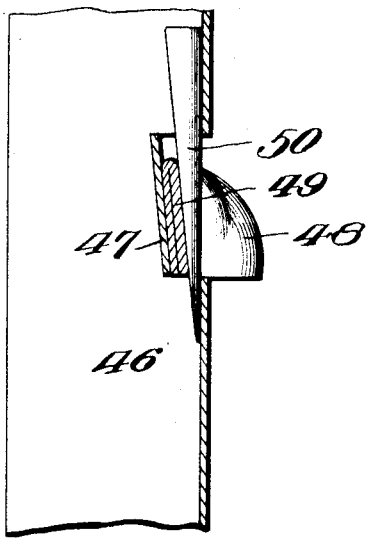
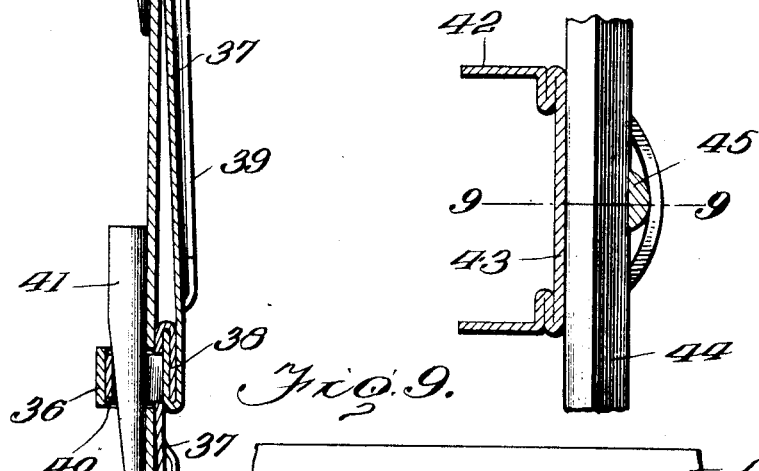
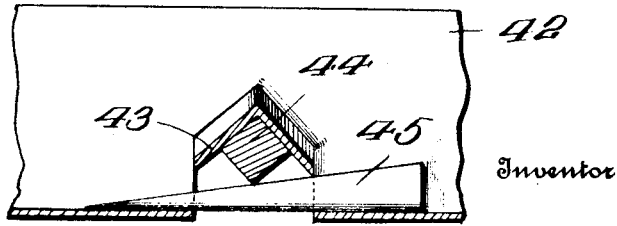

UNITED STATES PATENT OFFICE.

CHARLES OHAVEN, OF GALESBURG, ILLINOIS.

FASTENING.

1,207,613.  Specification of Letters Patent.  Patented Dec. 5, 1916.

Application filed April 23, 1915. Serial No. 23,447.

*To all whom it may concern:*

Be it known that I, CHARLES OHAVEN, a citizen of the United States, residing at Galesburg, in the county of Knox and State of Illinois, have invented certain new and useful Improvements in Fastenings, of which the following is a specification.

This invention contemplates an improved fastening especially designed for use in connecting cross arms to telegraph poles, for connecting the insulator brackets to the said cross-arms, for connecting the wires of telegraph and telephone lines to their supports and for connecting strand wires to metal fence posts and the like.

The invention has as its primary object to provide an improved fastening adapted to detachably and securely connect the elements to be joined and wherein the fastening means employed may be readily arranged in operative position to effect the connection of the said elements or may be easily released to effect their disconnection.

The invention has as a further object and one of equal importance with the foregoing to provide a fastening adapted to rigidly connect the elements to be joined and which will be exceedingly simple in construction so as to be thus adapted for use under almost any circumstance where it is desired to detachably connect coacting elements one of which is formed of sheet metal.

Figure 1:
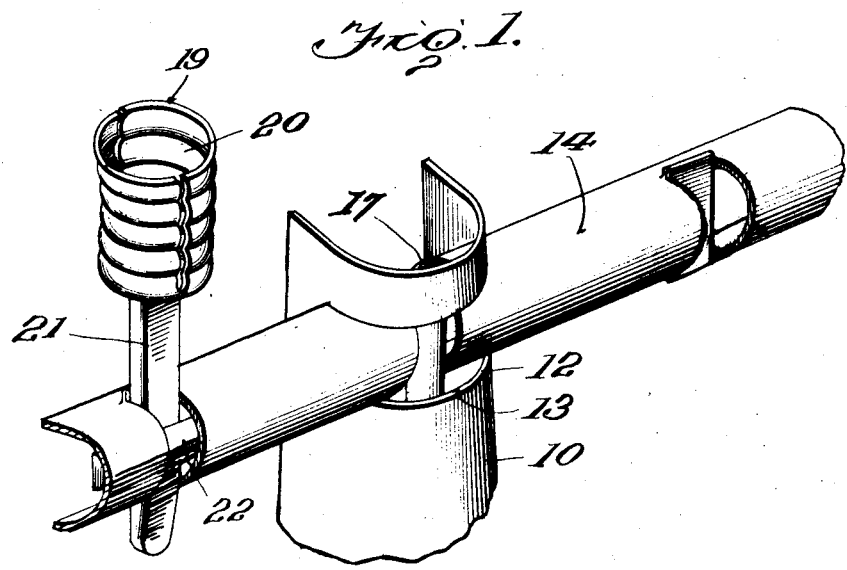
Figure 2:
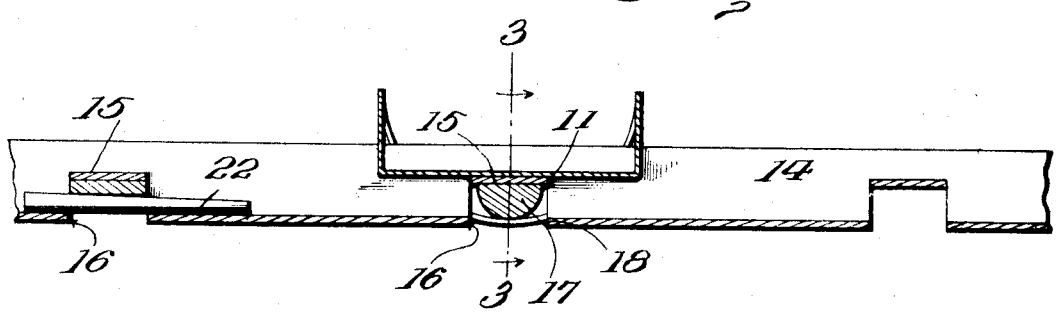
Figure 3:
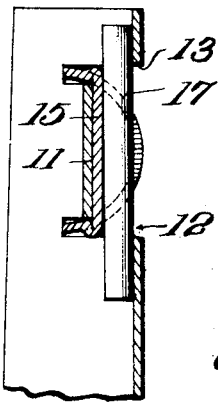

Other and incidental objects will appear as the description proceeds and in the drawings wherein I have illustrated the preferred embodiment of the invention and wherein similar reference characters designate corresponding parts throughout the several views, Figure 1 is a fragmentary perspective view showing my improved fastening as used in connection with a telegraph pole or support, the cross arm therefor and the insulator bracket upon the cross-arm, Fig. 2 is a horizontal sectional view more particularly showing the arrangement of the coacting elements illustrated in Fig. 1, Fig. 3 is a transverse sectional view taken on the line 3—3 of Fig. 2, this view particularly illustrating the disposition of the wedge employed for holding the coacting elements together, Fig. 4 is a fragmentary sectional view showing the application of the invention in detachably connecting telegraph wires and the insulation therefor, to the supports for said wires, Fig. 5 is a sectional view taken on the line 5—5 of Fig. 4 and particularly illustrating the disposition of the coacting parts of the fastening, Fig. 6 is a view showing the application of the invention for connecting strand wires to fence posts or the like, Fig. 7 is a fragmentary perspective view showing the application of the invention to the coacting elements of siding, roofing or the like, Fig. 8 is a sectional view showing the use of the invention in mounting harrow teeth or other elements having angularly disposed side faces, Fig. 9 is a transverse section taken on the line 9—9 of Fig. 8 and showing the cross-sectional contour of the bridge pieces employed in this adaptation of the invention, Fig. 10 is a fragmentary perspective view showing a further adaptation of the invention in the mounting of the cross arms for telegraph poles or the like, Fig. 11 is a sectional view more particularly showing the specific mounting of the cross arms shown in Fig. 10, and Fig. 12 is a fragmentary perspective view showing a modified form of bridge piece.

In Figs. 1, 2, and 3 of the drawings, I have illustrated the use of my invention in connecting a cross arm to a telegraph pole or support as well as the manner in which the insulator brackets may be attached to the said cross arm. The pole 10 which may be formed of sheet metal or any other suitable material, is arcuate at its upper extremity or substantially semi-circular in cross-section. The body portion of the pole upon the convex side thereof is slit or cut upon spaced parallel lines to release the transversely extending web or bridge piece 11. As best shown in Fig. 2 of the drawings, the bridge piece 11 after having been so released, is bent into substantially straight form to thus define an opening 12 in the body 10, the said bridge piece being integral with the body and connected therewith at its extremities. Adjacent the ends thereof, the bridge piece 11 is longitudinally bent upon itself so that the said bridge piece extends within the opening 12 in spaced relation laterally upon one side of the arcuate shoulders 13 formed by the inner face of the body 10 upon opposite sides of the opening 12.

Arranged to coact with the body 10 is a cross arm 14 which may be formed of sheet metal or any other suitable material or other form and which is, as is the body 10, also substantially semi-circular in cross-section. Formed on the cross arm 14 at any suitable point, is a transversely extending bridge piece 15 which is struck from the body portion of the cross arm in the same manner as just previously described relative to the formation of the bridge piece 11 and the release of which defines an opening 16 in the cross-arm. It will be observed that the bridge pieces 11 and 15 are preferably flat and as will, of course, be readily understood, may be of any desired width, the width of the openings 12 and 16 corresponding respectively to the width of the tongues 11 and 15.

In carrying out the invention in the adaptation thereof being described, the opening 12 in the body 10 is of a width to receive the cross arm 14 with the free side margins of the cross arm embracing the bridge piece 11, the body 10 being cut away upon each side of the said bridge piece to receive said margins as clearly illustrated in Fig. 3 of the drawing. By this arrangement, it will be observed that the walls defining the opening 12 in the body 10 are adapted to support the cross arm 14 in a vertical plane and when the said arm is positioned upon the body, the web or bridge piece 15 will seat against the bridge piece 11 in the manner best shown in Figs. 2 and 3 of the drawings.

Arranged to coact with the bridge pieces 11 and 15 is a wedge or locking member 17. The wedge 17 may be formed of any suitable material and is, as best shown in Fig. 2 of the drawings, substantially semi-circular in cross section, being provided with a curved side and preferably one flat side. In use, the wedge 17 is freely received within the opening 16 of the cross arm to seat by its flat side against the adjacent flat face of the bridge piece 15, with the curved side of the wedge extending transversely of and engaging the shoulders 13 formed by the inner face of the body 10, upon each side of the opening 12.

It will, of course, be understood, that the wedge 17 is removably fitted in operative position and it will be observed that the cross arm 14 will be detachably connected with the body or post 10. In releasing the bridge piece 15 of the cross arm 14, shoulders 18 are formed which define the opening 16. These shoulders, when the wedge 17 is arranged in operative position, as shown in Fig. 2 of the drawings, are adapted to engage the wedge to thus prevent any longitudinal shifting of the cross arm 14 relative to the wedge, while, owing to the longitudinal curvature of the shoulders 13, the wedge itself is also prevented from shifting longitudinally of the said shoulders. A firm and rigid connection is thus provided between the cross arm and the body 10 while, as will be readily observed, the said cross arm may be easily arranged in position and may be removed with equal facility.

It will, of course, be understood that the body 10 may, at any desired number of longitudinally spaced points, be provided with a plurality of bridge pieces 11 and will thus be adapted to receive a corresponding number of cross arms 14. In a similar manner, the cross arm 14 may be provided with any desired number of bridge pieces 15, three of such bridge pieces being shown in Figs. 1 and 2. One of the bridge pieces will be employed in connecting the cross arm with the body or post 10 while the other bridge pieces may be used in mounting a plurality of insulator brackets.

In Figs. 1 and 2 of the drawings, I have shown an insulator bracket or support 19 mounted in operative position upon one of the bridge pieces of the cross arm 14. This bracket includes a substantially cylindrical externally screw threaded head 20 adapted to receive a suitable insulator in the well known manner. Extending laterally from the head 20 is a stem or shank 21 which extends freely through the adjacent opening 16 in the cross arm and seats upon the contiguous bridge piece 15. Coacting with the cross arm and with the bridge piece, is a suitable wedge 22 which is substantially similar in construction to the wedge 17, the wedge 22 extending across the adjacent opening 16 and engaging between the inner face of the cross arm and the stem 21, for urging the stem toward the bridge piece.

It will thus be seen that in connecting the bracket 19 to the cross arm, the same principle is followed as is carried out in connecting the cross arm to the post or body 10. The adjacent edges of the shoulders 16 defining the opening in which the stem 21 is fitted, are adapted to engage the stem to prevent lateral shifting thereof while the wedge 22 will support the stem vertically. In this connection, it may be stated that if desired, the stem 21 may be tapered longitudinally to thus thoroughly coact with the wedge 22.

In Figs. 4 and 5 of the drawings, I have shown the application of the invention in supporting telegraph or telephone wires and the insulators therefor. The cross arm or support for the wire is designated by the numeral 23, the said cross arm being substantially similar in construction to the cross arm 14, and being provided at suitably spaced points, with any desired number of bridge pieces 24 formed in a manner identical with the bridge pieces previously described, one of the bridge pieces 24 being shown. In releasing the bridge 24 an opening 25 is defined in the cross arm or support 23, the side edges defining said opening providing spaced parallel shoulders 26, Removably received within the opening 25 is a wire conventionally shown at 27 which wire is surrounded by an insulator 28. As best shown in Fig. 4 of the drawings, the insulator 28 is formed of mating semi-circular sections which are adapted to surround the wire 27 and are detachably connected thereto. The insulator 28 is removably received within the opening 25 to seat upon the bridge piece 24 in engagement with the shoulders 26. When thus arranged in position, the wedge 29 is removably engaged between the inner face of the cross arm or support 23 and the insulator 28, being arranged to extend across the opening 25 in the manner shown in Fig. 4 of the drawings.

It will thus be observed that this adaptation of my improved fastening is the same in principle as the other adaptations of the invention previously described and provides an efficient means whereby telegraph and telephone wires and the insulators therefor, may be detachably connected to their supports.

In Fig. 6 of the drawings, I have shown the application of the invention in connection with a fence post 30. The post 30 may be formed of sheet metal or any other suitable material and is arcuate or substantially semi-circular in cross-section, as are the other forms of supports or body portions shown. Formed in the post 30 at suitable longitudinally spaced points, are a plurality of bridge pieces 31, 31$^a$ and 31$^b$, each identical in construction with the bridge pieces previously described and which are formed in a simlar manner. As will be well understood, the post may be provided with any desired number of bridge pieces, but I have disclosed the use of three in order to better illustrate the adaptability of the invention in this connection to support strand members of various characters.

In Fig. 6, I have illustrated a conventional type of strand wire A arranged in coacting relation to the bridge piece 31, the said strand wire being detachably connected to the post 30 by a wedge 32 substantially similar in construction to the wedges previously described, the wedge 32 being arranged to engage against the inner face of the post 30 for urging the strand wire toward the bridge piece 31 in a manner which, from the preceding description will be readily understood. Arranged to coact with the bridge piece 31$^a$ is a conventional type of strand wire B which is removably held in position by a wedge 33 similar to the wedge 32, while I have shown another form of conventional strand member C arranged in coacting relation to the bridge piece 31$^b$ the strand member C being removably held in position by a wedge 34 similar to the wedges 32 and 33. It will thus be observed that my improved fastening is adapted to operatively support almost any conventional type of fence strand member in such manner that the members may be readily mounted in position and may be easily removed.

In Fig. 7 of the drawings, I have illustrated the invention used in connection with coacting members of siding, roofing, or the like, which are mounted upon a suitable supporting member 35 preferably arcuate in cross-section and from which is struck at spaced points, bridge pieces 36. The siding or roofing members are designated at 37 and are each preferably formed from a flat piece of sheet metal although any other suitable material may be employed. The members 37 upon the longitudinal edges thereof are provided with interlocking flanges 38 and at their ends are also provided with similar flanges 39. Struck from each of the members, adjacent the longitudinal side edges thereof and preferably at points medially of the members, are tongues or bridge pieces 40 adapted to seat against the bridge pieces 36. Arranged to engage between the support 35 and the tongues 40 for urging the tongues into engagement with the bridge pieces in a manner which, from the preceding description will be entirely clear, are wedges 41, detachably connecting the members 37 with the support.

In Figs. 8 and 9 of the drawings, I have illustrated a further adaptation of the invention as used in detachably mounting harrow teeth or other elements having angularly disposed side faces. For convenience, I have conventionally illustrated a beam 42 which is substantially arcuate in cross-section, and from which is struck in the manner most clearly shown in Fig. 8, a bridge piece 43, particular attention being directed to the fact that the said bridge piece is bent longitudinally to provide angularly disposed portions and is thus adapted to receive a harrow tooth or other element conventionally shown at 44 which is formed with angularly disposed side faces. Bearing between the body of the beam 32 and the tooth 44 is a wedge 45, the wedge urging the tooth 44 into engagement with the bridge piece 43 and detachably holding the harrow tooth in position. An examination of this modification of the invention will disclose that my improved fastening may be employed for holding elements having various cross-sectional contours and will, in all such instances, effectually support the said elements.

In Figs. 10 and 11 of the drawings, I have illustrated a further modification in the mounting of cross arms for telephone or telegraph poles. The pole is indicated at 46 and is formed with a bridge piece 47. Mounted upon the pole is a cross arm 48 which may be formed of metal or any suitable material, and which, adjacent the extremities thereof, is substantially semi-circular in cross-section, while the said cross-arm, intermediate its ends, is flattened, as shown at 49 to seat against the bridge piece 47. Detachably connecting the cross arm 48 with the pole is a wedge 50. It is thought unnecessary in view of the preceding description to specifically describe the mounting and manner of application of this wedge.

The cross arm 48 at any suitable number of points is provided with a plurality of bridge pieces, one of which is shown at 51 and which is adapted to receive one of the insulators 28 carrying a wire conventionally shown at 52. Detachably connecting the insulator with the cross arm for operatively supporting the wire is a wedge 53, this wedge being identical in construction to the wedges previously described and used in a similar manner. In forming the cross arms of telegraph poles in accordance with this modification, it will be seen that the use of insulator brackets 21 such as previously described, will be eliminated.

In Fig. 12 of the drawings, I have illustrated a still further modification of the invention which may be employed in connection with roofing, siding or the like, and one of the roofing or siding members is conventionally illustrated at 54. Secured to the said member at proper points, are any suitable number of brackets or bridge pieces, one of which is shown at 55. The bracket 55 may be formed of wire or any other suitable material and is substantially U-shaped in general contour, the bight portion of the U being supported in spaced relation to the adjacent face of the member while the terminals of the bracket are provided with eyes which receive rivets 56 or other suitable fastening devices for connecting the bracket to the member. It will now be seen that when it is desired to mount the member 54, the bight portion of the bracket 55 is adapted to seat against the bridge piece of a support in such manner that a wedge of the character previously described, may be engaged as herein previously set forth, between the body of the support and the bight portion of the bracket for urging the bracket into engagement with the bridge piece of the support and for detachably mounting the member 54 in position, this mounting of the member 54 being very similar to the mounting of the members 37 in that modification of the invention shown in Fig. 7 of the drawings. In some instances, it may not be found expedient to strike a tongue from the member to be supported as in the modification shown in Fig. 7, and it will be seen that in providing the bracket 55, this difficulty will be readily overcome.

Having thus described my invention, what I claim and desire to secure by Letters Patent is:—

1. A device of the character described including a body portion provided with a bridge piece, an element having a tongue struck therefrom adapted to seat against the bridge piece, and a locking member adapted to engage between the body portion and the said tongue for urging the tongue into engagement with the bridge piece.

2. A fastening including a body portion provided with a bridge piece, an element having a bracket mounted thereon seating against the bridge piece, and a locking member engaging between the body portion and the bracket for urging the bracket into engagement with the bridge piece and connecting the said element with the body portion.

3. A device of the character described including a body portion provided with a bridge piece, an element mounted upon the body portion and engaging opposite edges of the bridge piece for holding the said element against rocking movement relative thereto, and a locking member engaging between the body portion and said element and coacting with the bridge piece to connect the said element with the body portion.

4. A device of the character described including a body portion having a bridge piece formed therefrom and provided with an opening, an element disposed in said opening and engaging opposite longitudinal edges of the bridge piece, and a locking member engaging between the body portion and said element and coacting with the bridge piece in connecting the element with the body portion.

5. A device of the character described including a body portion provided with a bridge piece and having notches formed therein at the extremities of the bridge piece, an element embracing the bridge piece with opposite margins thereof disposed in said notches, and a locking member engaging between the body portion and said element and coacting with the bridge piece in connecting the element with the body portion.

6. A device of the character described including a body portion having a bridge piece released therefrom to provide an opening in the body portion, an element disposed in said opening and having a bridge piece released therefrom to provide an opening in the said element, the bridge piece of the element seating against the bridge piece of the body portion, and a locking member disposed in the opening in the said element and engaging the body portion for urging the bridge piece of said element into engagement with the bridge piece of the body portion.

7. A device of the character described including a body portion having a bridge piece released therefrom to define an opening in the body portion, an element having the sides thereof bent toward each other at a point intermediate the length of the said element to fit in said opening in engagement with the said bridge piece, and a locking member engaging between the body portion and the said element for urging the element into engagement with the bridge piece.

8. A device of the character described including a body portion having a bridge piece released therefrom to define an opening in the body portion, an element seating against the body portion and provided with a flange adapted to interlock with the flange of an adjacent element, a bridge piece carried by the said element and received in said opening of the body portion to seat against the bridge piece of the body portion, and a locking member engaging between the body portion and the bridge piece of the said element for urging the bridge of the element into engagement with the bridge pieces of the body portion.

9. A device of the character described including a body portion provided with a bridge piece, an element supported by the body portion, a bridge piece carried by said element and adapted to coact with the bridge piece of the body portion, and a locking member engaging between the body portion and the bridge piece of said element for urging the bridge piece of the element into engagement with the bridge piece of the body portion for connecting the said element with the body portion.

In testimony whereof I affix my signature in presence of two witnesses.

CHARLES OHAVEN. [L. S.]

Witnesses:
C. E. JOHNSON,
A. R. CHRISTENSON.